Patented May 27, 1952

2,597,872

UNITED STATES PATENT OFFICE 2,597,872

AQUEOUS DISPERSIONS OF WATER-INSOLUBLE ORGANIC POLYMERS CONTAINING COLLOIDAL SILICA

Ralph K. Iler, Cleveland Heights, Ohio, assignor to E. I. du Pont de Nemours & Company, Wilmington, Del., a corporation of Delaware No Drawing. Application July 3, 1950, Serial No. 172,021

11 Claims. (Cl. 260—29.6)

This invention relates to novel chemical compositions which are aqueous dispersions containing an alkali-stabilized colloidal silica and a dispersed water-insoluble organic polymer, and is more particularly directed to such compositions in which the alkali-stabilized colloidal silica is a material having an average ultimate particle size not exceeding about 0.03 micron in diameter prepared by a process including the step of passing an alkali silicate solution through an acid-regenerated ion exchange resin.

Water-soluble alkali metal silicates having calculated weight ratios of $SiO_2$:alkali (in which the alkali is calculated as $Na_2O$) up to 4:1 are well known commercial products, and procedures for making colloidal silica solutions from such silicates as, for instance, by acidifying them, are also well known. Unfortunately most of the colloidal silica solutions made in this manner are unstable, precipitating as gels within relatively short times after preparation. Accordingly it has long been considered impracticable to make and transport colloidal silica solutions in the usual commercial channels.

Recently, however, compositions which may be described as alkali-stabilized colloidal silica solutions have become available. These colloidal solutions, the preparation of which is described, for instance, in Bird Patent 2,244,325, and in the co-pending application of Bechtold and Snyder, Ser. No. 65,536, filed December 6, 1948, now U. S. Patent 2,574,902, are stable against gelling over prolonged periods, so that it is entirely practicable to transport them and use them at times and places considerably removed from their point of preparation. They contain an alkali such as the hydroxide of sodium, potassium, lithium, or ammonium, or an organic amine. The weight ratio of $SiO_2$ to alkali (the alkali being calculated as $Na_2O$) may be from 10:1 up to as high as 130:1, making it obvious that the alkali and silica are combined in a special manner not found in conventional alkali metal silicates, since the latter cannot be prepared in a form soluble and stable in aqueous solution at ratios above about 4:1.

Now according to the present invention novel and highly useful compositions are provided in the form of aqueous dispersions containing an alkali-stabilized colloidal silica and a dispersed water-insoluble organic polymer. It is preferred that the alkali-stabilized colloidal silica be a material having an average ultimate particle size not exceeding about 0.03 micron in diameter and be prepared by passing alkali silicate solution through an acid-regenerated ion exchange resin.

The water-insoluble organic polymer may, for instance, be an elastomeric material such as latex, including natural rubber, synthetic rubber, or polychloroprene.

The elastomer may be any rubber-like polymeric material. The term "elastomer" is a general descriptive term for this class of products and may be regarded as an abbreviation for "elastopolymer" or "elastic polymer." (See "Advances in Colloid Science," volume 2, 1946, at page XXV.) As here used it may be understood to cover the high molecular elastic colloid, natural caoutchouc, as well as synthetic rubbers and rubber-like materials such as neoprene, butyl rubber, and the styrene-butadiene copolymer known as GR-S.

More particularly, some of the elastomers included are butadiene copolymerized in various ratios with styrene, butadiene copolymerized in various ratios with acrylonitrile, polymerized butadiene, polymerized 2,3-dimethyl butadiene, polymerized 2-cholorobutadiene, 1,3,isobutylene copolymerized with isoprene, copolymers of butadiene and methamethacrylate, butadiene copolymerized with methylvinyl ketone, and various other copolymers of butadiene with ethylenic-unsaturated methyls. It will be noted that the invention is applicable to diene elastic polymers as a class.

The alkali-stabilized colloidal silica may be added to a latex of the elastomer, that is, an aqueous dispersion of the elastomer. In this manner very uniform dispersion of the silica throughout the latex is achieved.

The polymer may, on the other hand, be an alkyd resin, nitrocellulose, a phenolic resin such as phenolformaldehyde resin, a bituminous material such as asphalt, or it may be polyvinyl acetate, a water insoluble starch, or a natural gum resin, such as shellac, copal gum (including Manila gum), rosin or a terpene. It will be noted that in their lower degrees of polymerization some of these organic polymers are somewhat water-soluble. It is intended to include in the scope of this invention only those polymers which are substantially water-insoluble, that is, which have a water solubility not in excess of about 10 grams per liter at 25° C.

The term "organic polymer" as used with reference to polymers will be understood to include materials which are predominately carbon, such as polyisoprene and other hydrocarbons, materials containing substituent groups, such as polyvinyl chloride, heteropolymers, materials containing a multiplicity of recurring carbon-containing groups and additionally containing a multiplicity of recurring carbon-containing groups and additionally containing a multiplicity of other recurring groups such as siloxane groups, and all other materials containing a multiplicity of carbon atoms recurring in the polymer chain.

The alkali-stabilized colloidal silica used in a composition of this invention is characterized by containing silica in the form of particles of colloidal dimensions. Although the colloidal range includes particles having an average diameter not exceeding about 0.1 micron nor less than about 0.001 micron, it is preferred in this invention, in order to obtain maximum advantage, to use colloidal silica having an ultimate particle size not exceeding about 0.03 micron and preferably in the range from 0.01 to 0.03 micron. By "ultimate particle size" is meant the average diameter of particle present as measured by means of the electron microscope when the solution is diluted to about 0.1% $SiO_2$ with water and dried in a very thin layer deposit.

The silica particles will not necessarily be present as anhydrous silicon dioxide, but rather, may be in a hydrated form associated with various proportions of water. Thus, partially dehydrated silicic acid would come within the term "silica" as herein used.

The silica solutions are also characterized by having hydroxyl ions and the corresponding cations of the alkali so disposed with relation to the silica particles as to prevent condensation between the particles by oxolation in aqueous solution at a concentration not exceeding about 45% $SiO_2$ by weight. As freshly prepared, the silicic acid in a silica solution may exist as low molecular weight polymers of the theoretical $Si(OH)_4$; however, a condensation reaction known as "oxolation" rapidly occurs whereby water splits out between hydroxyl groups attached to silicon atoms, an Si—O—Si linkage is formed, and a polymer is produced. This process may continue indefinitely and in such a manner that the silicic acid solution rapidly sets up to a gel, the oxolation occurring between externally disposed hydroxyls, i. e., hydroxyls not already inactivated by being inwardly located within a siloxane ring or micelle. It has been found, however, that such polymerization is retarded by the presence of a small amount of alkali such as sodium hydroxide. In the sense that the ions from the alkali are responsible for retardation of the gelling rate of silicic acid solution they may be said to act as "blocking groups."

It will be obvious that the alkali and silica in the colloidal silica solutions used in the present invention are associated in a manner radically different from that present in the conventional alkali silicates of the prior art. A proportion of alkali as small as here present would be completely inadequate to render soluble a conventional silicate glass or to peptize it to form a stable colloidal solution.

The colloidal silica solutions used in the present invention are characterized by containing silica in the form of discrete ultimate particles, and the alkali present is not uniformly distributed throughout the particles, but rather, is substantially all outside of the particles, except perhaps for occluded traces. Being external, the cations of the alkali can be removed by such methods as dialysis or ion exchange using an acid-regenerated cation exchange resin, without affecting the structure of the silica particles. The resultant alkali-free silica sols are unstable toward gelation, but they may be restabilized by adding back a small proportion of an alkali such as sodium hydroxide. Hence the colloidal silica solutions used according to this invention may properly be referred to as "alkali-stabilized." This stabilization may be accomplished by processes described in the Bird Patent 2,244,325. In order to produce stable solutions with a minimum of alkali stabilizing agent, the polymerization of the silicic acid may be carried to a relatively high molecular weight so as to produce large molecules or colloidal particles which then retain only a small percentage of the reactive hydroxyl groups originally present, and which thus require only a small amount of alkali as a stabilizer. On the other hand the polymerization must not proceed to the formation of a gel.

A very practical method for producing stabilized aqueous colloidal silica solutions consists in passing an alkali silicate solution through an acid-regenerated ion exchange resin as described in the above-mentioned Bird patent whereby alkali ions are removed from the silicate and replaced with hydrogen ions. In this instance the alkali ions may be completely removed and then alkali hydroxide may be added to furnish the necessary ions required for stabilization.

A particular stabilized aqueous colloidal silica solution which may be used in a composition of this invention is described in the Bird patent at page 2, column 1, lines 12 to 68. As stated in the Bird patent the weight ratio of $SiO_2$ to $Na_2O$ may be as high as from 75 to 100:1 and as low as 10:1, but ratios from 30:1 to 80:1 give superior results and are preferred. The higher the ratio, of course, the lower will be the proportion of cations from the alkali.

Methods other than the one above-described for producing stabilized colloidal silica solutions from alkali silicates by ion-exchange methods may be employed. The use of cation-exchangers in various relations is generally well understood and is described, for instance, in the above-mentioned Bird Patent 2,244,325 and in the Hurd Patent 2,431,481. The Voorhees Patent 2,457,971 also describes cation-exchangers and also shows a method for the preparation of silica sols of the type herein used. The literature is also full of references to cation-exchangers and to their use.

Any insoluble cation-exchanger may be used in processes of the invention and there may be used, for instance, the salts of sulfonated carbonaceous exchangers or of sulfonated or sulfited insoluble phenol-formaldehyde resins or acid-treated humic material, or other similar exchangers. Sulfonated coal, lignin, peat, or other insoluble sulfonated humic organic material may be used.

Even more preferable are the insoluble resins made from phenols, such as those made from phenol itself, diphenylol sulfone, catechol, or naturally occurring phenols, as found, for example, in quebracho, and an aldehyde, particularly formaldehyde, which are modified by the introduction of sulfonic groups either in the ring or on methylene groups. Cation-exchangers which are stable in their hydrogen forms are available commercially under such trade names as "Amberlite," "Zeokarb," "Nalcite," "Ionac," etc. "Amberlite" is a modified phenol-formaldehyde-sulfonic acid-type resin, "Zeokarb" is a sulfonated coal of the carbonaceous zeolite type, "Nalcite" is a nuclear sulfonated polymer of styrene containing divinyl benzene, and "Ionac" is a phenol-formaldehyde sulfonate—see Ion-Exchange Theory and Application by F. C. Nachod, Academic Press, Inc., New York, N. Y., 1949, at page 385 et seq.

The exchanger can be initially in the acid form or, if desired, it can be converted to the ammonium form as shown in Voorhees 2,457,971 to provide cation-exchangers suitable for use.

The exchanger is generally prepared in granular form which is readily leached free of soluble acids or salts. If the exchanger is exhausted by use it may readily be converted to the acid form by washing with a solution of an acid such as hydrochloric, sulfuric, formic, sulfamic, carboxylic, or the like. The exchanger may be treated instead with an ammonium compound such as ammonium hydroxide or ammonium chloride.

One of the preferred cation-exchange resins for use according to the present invention is an aromatic hydrocarbon polymer containing nuclear sulfonic acid groups which is designated "Dowex 50" and of the general type described in D'Alelio 2,366,007 and which is fully described as to its characteristics, properties, and general mode of use in the Journal of the American Chemical Society for November 1947, volume 69, No. 11 beginning at page 2830.

The disclosure in the Bird patent describes the preparation of an effluent from the ion exchanger having a silica content of about 3 to 3.5% which may be evaporated, preferably in a vacuum evaporator to about one-half its original bulk thereby raising its silica content to about 6 to 6.5%. Even at 6.5% $SiO_2$ the solutions are too dilute to be shipped, stored, and handled economically and it is preferred to evaporate them to an $SiO_2$ content of from 18 to 30%. This may be done in a number of ways and the product obtained will have somewhat different characteristics depending upon the method of evaporation. For instance, the evaporation may be carried out at elevated temperature—that is, about 60° C. This may be done in the batchwise manner at constant volume, by adding a suitable volume of effluent from the ion exchanger to the evaporator and adding additional fresh effluent at the same rate that water is evaporated off so that the volume in the evaporator remains substantially constant. Preferably, the process will be continued until at least five times as much fresh effluent has been added as was originally present. The evaporation may be carried out at atmospheric pressure or even superatmospheric pressure to give a product having maximum stability and containing as high as 30 to 35% $SiO_2$. The molecular weight of the silica is about from 0.6 to 4.0 million and the average particle size is well below 30 millimicrons. The silica:alkali ratio is preferably in the range of from 60:1 to 130:1.

An alternative method of evaporation, which gives a product of higher molecular weight but still of colloidal dimensions, may be obtained by carrying out the evaporation at constant volume but in a continuous manner. Thus, from a constant volume in the evaporator concentrated product is continuously withdrawn and fresh effluent is added at a rate sufficient to maintain constant volume in the evaporator and to make up the decrease effected by evaporation and product withdrawal. The product thus obtained contains particles of substantially uniform size corresponding to a molecular weight lying in the range of about from 0.6 to 100.0 million.

The alkali-stabilized colloidal silica solutions incorporated in the compositions of this invention are still further characterized by having, in dilute aqueous solution, an extinction coefficient of less than 0.25 for light having a wavelength of 400 millimicrons.

Colloidal suspensions are more or less cloudy to visible light, depending upon the wavelength, the finer the particles the clearer the solution. Other factors, such as the relative refractive indices of the particles with respect to the solvent or dispersion medium, of course also play a role in determining the degree of turbidity, but, in general, the appearance of the solution gives some indication of the relative size of the dispersed particles in any given system.

By comparing solutions of colloidal silica at the same concentration of $SiO_2$, the relative transparency to light is an indication of the type of particles present. However, by working with monochromatic light and by measuring the percentage of light transmitted through a solution of given depth at a given concentration of silica, there can be calculated a constant, known as the "extinction coefficient."

By a combination of Beer's and Lambert's law, the following formula can be arrived at:[1]

$$E^{1\%}_{1\text{ cm.}} = \frac{1}{pL}\log_{10}\left(\frac{I_0}{I}\right)$$

Where $E^{1\%}_{1\text{ cm.}}$ = extinction coefficient $p$ = per cent by weight of $SiO_2$ in the colloidal solution
$L$ = length of absorption cell in centimeters
$I_0$ = 100, taking the transmission of the dispersion medium, water, to be 100
$I$ = observed transmission of light of a given wavelength as compared to the transmission of pure water It will be noted that the extinction coefficient for a given type of solution is a constant which is independent of the concentration of the solution and of the length of the cell through which the light passes, but the numerical value depends upon the manner in which the concentration of the solution is expressed and upon the unit in which the length of the cell is measured. In this case, the extinction coefficient is given in terms of the percentage by weight of silica in solution and in terms of centimeters of cell length.

Since light consists of electromagnetic waves, it is, of course, important to choose a wavelength such that the colloidal particles involved will have some action on the waves. For example, if one chose to use infra-red light, it is possible that colloidal solutions of sub-microscopic particles might be almost equally transparent, while if a very short wavelength in the ultra-violet range were used, relatively small differences in particle size would make a considerable difference in the relative percentage transmission of light through the two solutions being compared. It has been found that colloidal solutions of silica having an ultimate particle size less than 0.03 micron can be distinguished from colloidal solutions of silica having particles considerably larger than this figure, by comparing them with ultra-violet light having a wavelength of 400 millimicrons.

It has been found according to this invention that colloidal solutions of silica having an extinction coefficient of less than 0.25 are espe-

[1] See Gibb, 1st ed., "Optical Methods of Analyses," page 73 et seq. (1942).

cially useful for incorporating into aqueous dispersions which also contain a water-insoluble organic polymer.

In addition to having a suitable extinction coefficient as above described, the colloidal silica sols of the Bechtold and Snyder application Ser. No. 65,536, which may be used in a preferred embodiment of this invention, are further characterized as follows:

When the sols are dried down for examination with the electron microscope, they are found to contain substantially spherical, discrete, dense, ultimate amorphous silica particles, substantially all of which have an average diameter in the range of 15 to 30 millimicrons, and at least 80% of which have an average diameter of from 0.5 to 1.7 times the arithmetic mean particle diameter. The particles have a molecular weight as determined by light scattering of the sol of more than one-half million. The sols have a relative viscosity, at 10% $SiO_2$, of from 1.15 to 1.55, and in the concentrated form, contain from 20 to 35% by weight of $SiO_2$. The methods of measuring viscosity, molecular weight by light scattering, particle size by means of the electron microscope, and the like are well known. They are also described in greater detail in the Bechtold and Snyder application.

An aqueous dispersion of the present invention may be produced by separately preparing an aqueous dispersion of the organic polymer and mixing it with an alkali-stabilized colloidal silica solution or it may be prepared by dispersing the organic polymer directly in such alkali-stabilized colloidal silica solution. By the former method, for instance, one might simply mix an aqueous dispersion of polyvinyl acetate with an aqueous alkali-stabilized colloidal silica solution, or one might disperse polyvinyl acetate in the alkali-stabilized colloidal silica solution in a suitable mixer such as a Banbury mixer. It will be understood that dispersion of the organic polymer may be facilitated by first softening it with plasticizers or dissolving it in organic solvents prior to dispersion in the aqueous phase. Alternatively, plasticizers may be added to the dispersion after it has been formed.

The concentration of solids in an aqueous dispersion of this invention may be widely varied, as may also the relative proportions of the organic polymer and colloidal silica. In general it has been found that as little as 2 parts by weight of alkali-stabilized colloidal silica per 100 parts by weight of organic polymer is sufficient to provide an appreciable modification of the properties of the organic polymer dispersions.

Compositions of this invention are useful for a variety of purposes. For instance, the compositions containing latex and alkali-stabilized colloidal silica are useful as adhesives. Dispersions of alkyd resins and of nitrocellulose in combination with alkali-stabilized colloidal silica provide improved coating compositions. Phenolic resins containing alkali-stabilized silica in aqueous dispersion are useful as binding agents. Water paints of the aqueous emulsion type, in which heat-bodied oils and oil-modified alkyd resins are dispersed with water along with pigment, show improved adhesion and durability when alkali-stabilized colloidal silica is added. Similarly, nitrocellulose emulsion coatings adhere better to smooth, hydrophilic surfaces when a minor proportion of sodium hydroxide-stabilized colloidal silica is present. Polyvinyl acetate emulsions containing the type of colloidal silica involved in this invention dry to harder, more water resistant films because of the insolubilizing and hardening action of the colloidal silica.

The invention will be better understood by reference to the following illustrative examples.

*Example I*

To 100 parts of a polyvinyl acetate dispersion containing about 50% by weight of solids there was added 22 parts of a 30% solution of sodium hydroxide-stabilized colloidal silica. After thorough mixing, the emulsion was applied by a knife-type coater to a heavy cardboard in such thickness as to result, after drying, in a film of polyvinyl acetate about 0.003" in thickness. The dried film was found to remain firm and to resist blushing when wetted with water, in comparison with a control film containing no silica, which readily softened and became tacky after soaking in water for 2 minutes. Also it was found that the coating containing silica was much more receptive to printing ink than the control.

*Example II*

Colloidal silica of less than 0.03 millimicron particle size, when incorporated into latex as an alkali-stabilized colloidal solution, definitely improves the adhesion of synthetic rubber to cellulose fabrics such as rayon. For example, a latex formulation was made up as follows:

| | Parts by weight |
|---|---|
| GR-S (styrene/butadiene copolymer) #3 latex (60% solids) | 100 |
| Zinc oxide | 5 |
| Phenyl betanaphthylamine antioxidant | 2 |
| Sulfur | 2 |
| Mercaptobenzothiazole accelerator | 1 |
| Butyl zimate | 0.5 |
| Carbon black Gastex | 10 |
| Aquarex D surfacing agent | 1.5 |
| Sodium hydroxide | 1.0 |
| Colloidal solution of alkali-stabilized colloidal silica containing 30% by weight of $SiO_2$ | 10 |

An identical latex formulation was also prepared for purposes of comparison containing no silica. Woven rayon fabric was coated with approximately 15% by weight of these latex compositions, dried for three to five minutes at 100° C., and again coated and dried. The coated fabric was then placed in contact with a typical GR-S compounded uncured synthetic rubber formulation and vulcanized under pressure for forty-five minutes, using a pressure of forty-five pounds steam. For testing, one-inch strips were cut out of the assemblies and the adhesion measured by pulling the fabric from the rubber to which it was vulcanized.

On a comparative basis, the fabric which had been pre-coated with the latex formulation containing colloidal silica required a pull of 3.9 pounds in order to pull the fabric from the rubber, while in comparison, the control, containing no silica, required only 2.9 pounds.

*Example III*

Sodium hydroxide-stabilized colloidal silica may advantageously be mixed with a dispersion of phenol-formaldehyde resin, either in the (a) or the (b) stage of polymerization. For the formulation of adhesives, the (a) stage is preferred.

For example, to 50 parts of an 18% solution of sodium hydroxide-stabilized colloidal silica there was added 100 parts of a phenol-formaldehyde resin emulsion containing 14.0% solids. Asbestos paper was impregnated with the resulting mixture and laid up to form a six-ply lamination after the paper has been dried. After curing for 30 minutes at 180° C. and at 1000#/sq. in. pressure, an excellent asbestos board was produced which was stiffer and more resistant to delamination, especially when wet, than a board similarly prepared without the incorporation of silica into the phenolic resin emulsion.

*Example IV*

To 50 parts of a concentrated water emulsion paint consisting of a dispersion of pigment and binder along with a dispersed heat-bodied drying oil (linseed oil), sufficient water was added to give a paintable consistency. To another 50 parts of the concentrated paint, were added about 100 parts of a 30% solution of sodium hydroxide-stabilized colloidal silica, giving a rather viscous fluid.

The thirty per cent product was made as described in the Bird patent by concentration of effluent. This was done by boiling the effluent slowly in a pot. As thus prepared the sol must be used rather quickly for it is not at all stable towards gelling. The stability is satisfactory after mixing with the emulsion which dilutes the sol.

Equal volumes of each of the concentrated water emulsion paint mixtures above described, were mixed to give an aqueous paint dispersion which was still slightly too thick to apply with a brush, but which became workable when a small amount of additional water was added.

This aqueous paint mixture was brushed on a smooth paper alongside a control containing no silica. After air-drying for about one hour, the paint film containing silica had a much better resistance toward rubbing when wet, than the unmodified paint, and upon flexing the paper the coating showed much better adhesion, especially on areas which had been printed with an oil ink, prior to application of the paint. It was evident that the silica improves the adhesion of the water paint to the surface of the paper especially where the paper is oily or greasy with dirt and also improves the washability of the finish. It is believed that the silica provides an improved bond between the water-insoluble dispersed oil binder and the other constituents of the paint film.

Other drying oils such as poppy and tung oils can be heat-bodied and used instead of the heat-bodied linseed oil of this invention.

*Example V*

100 parts of blown castor oil were emulsified into 100 parts of an 18% solution of sodium hydroxide-stabilized colloidal silica with the aid of 4 parts by weight of carboxy methyl cellulose as the dispersing agent. The resulting emulsion was coated as a thin film on a clean sheet of steel, permitted to dry in the air for 3 hours, and then baked for 1 hour at 130° C. The resulting film was definitely harder than a control similarly prepared without the inclusion of colloidal silica. It was also noted that the film containing the colloidal silica air-dried more rapidly than the control.

*Example VI*

A composition of this invention containing starch as the dispersed insoluble organic polymer was made up in the following proportions:

| | Parts by weight |
|---|---|
| Starch (50 fluidity pearl) | 16 |
| Clay (kaolinite-type sub Cretaceous) | 64 |
| Water | 110 |
| Sodium-hydroxide-stabilized colloidal silica solution (18% $SiO_2$) | 10 |

The clay was first mixed with ⅜ of the water and the colloidal silica solution was then added. The clay slip was then added with stirring to a starch suspension made by dispersing the starch in the remaining ⅝ of the water.

This aqueous dispersion was applied as a coating to several different types of paper, including bleached sulfite, rag and kraft, by both brushing it on, and by a doctor blade technique. After drying it was found that the clay was present on the papers as a uniform, adherent coating. This coating was found to be resistant to wet-rubbing, that is, the coating was not easily rubbed off by abrasion when wet; it resisted removal by soaking, being fast after soaking for an hour; it stiffened thin papers; and it took ink marking satisfactorily. A control coating, prepared in identical manner except that no colloidal silica was present, was less water resistant and did not take ink satisfactorily.

This application is a continuation-in-part of my co-pending application Ser. No. 699,087, filed September 24, 1946, now abandoned.

I claim:

1. A composition comprising an aqueous dispersion of a dispersed water-insoluble organic polymer and, per hundred parts by weight of polymer, at least two parts by weight of an alkali-stabilized colloidal silica of ultimate particle size less than 0.03 micron, the alkali being substantially all outside of the silica particles whereby condensation between the silica particles is retarded.

2. A composition comprising an aqueous dispersion of a dispersed water-insoluble organic polymer and, per hundred parts by weight of polymer, at least two parts by weight of an alkali-stabilized colloidal silica of ultimate particle size less than 0.03 micron and prepared by a process including the step of passing an alkali silicate solution through an acid-regenerated ion exchange resin.

3. A composition comprising an aqueous dispersion of a dispersed water-insoluble organic polymer and, per hundred parts by weight of polymer, at least two parts by weight of a sodium hydroxide-stabilized colloidal silica of ultimate particle size less than 0.03 micron and prepared by a process including the step of passing a sodium silicate solution through an acid-regenerated ion exchange resin.

4. A composition comprising an aqueous dispersion of a dispersed water-insoluble organic polymer and, per hundred parts by weight of polymer, at least two parts by weight of an alkali-stabilized colloidal silica of ultimate particle size less than 0.03 micron having an extinction coefficient of less than 0.25 and prepared by a process including the step of passing an alkali silicate solution through an acid-regenerated ion exchange resin.

5. A composition comprising an aqueous dispersion of a dispersed water-insoluble organic polymer and, per hundred parts by weight of polymer, at least two parts by weight of an alkali-stabilized colloidal silica, the silica:alkali ratio being from 60:1 to 130:1, the silica particles having a molecular weight as determined by light scattering, of more than one-half million and having an average diameter in the range of 15 to 30 millimicrons and at least 80% of the particles having an average diameter of from 0.5 to 1.7 times the arithmetic mean particle diameter, and the particles being of such a dense and discrete character that the relative viscosity of a sol containing 10% of the silica and 90% of water by weight is from 1.15 to 1.55, the alkali-stabilized colloidal silica having an extinction coefficient of less than 0.25 and being prepared by a process including the step of passing an alkali silicate solution through an acid-regenerated ion exchange resin.

6. A composition comprising an aqueous dispersion of a dispersed water-insoluble starch and an alkali-stabilized colloidal silica of ultimate particle size less than 0.25 and prepared by a process including the step of passing an alkali silicate solution through an acid-regenerated ion exchange resin.

7. A composition comprising an aqueous dispersion of a dispersed water-insoluble polyvinyl acetate and an alkali-stabilized colloidal silica of ultimate particle size less than 0.03 micron having an extinction coefficient of less than 0.25 and prepared by a process including the step of passing an alkali silicate solution through an acid-regenerated ion exchange resin.

8. A composition comprising an aqueous dispersion of a dispersed water-insoluble heat-bodied drying oil and an alkali-stabilizing colloidal silica of ultimate particle size less than 0.03 micron having an extinction coefficient of less than 0.25 and prepared by a process including the step of passing an alkali silicate solution through an acid-regenerated ion exchange resin.

9. A composition comprising an aqueous dispersion of a water-insoluble conjugated diene elastomer and an alkali-stabilized colloidal silica of ultimate particle size less than 0.03 micron having an extinction coefficient of less than 0.25 and prepared by a process including the step of passing an alkali silicate solution through an acid-regenerated ion exchange resin.

10. A composition comprising an aqueous dispersion of a dispersed, water-insoluble, conjugated diene elastomer and, per hundred parts by weight of elastomer, at least two parts by weight of an alkali-stabilized colloidal silica of ultimate particle size less than 0.03 micron, the alkali being substantially all outside of the silica particles, whereby condensation between the silica particles is retarded.

11. A composition comprising an aqueous dispersion of dispersed shellac and, per hundred parts by weight of shellac, at least two parts by weight of an alkali-stabilized colloidal silica of ultimate particle size less than 0.03 micron, the alkali being substantially all outside of the silica particles, whereby condensation between the silica particles is retarded.

RALPH K. ILER.

REFERENCES CITED

The following references are of record in the file of this patent:

Fisher, Ind. and Eng. Chem., vol. 31, Aug. 1939, p. 942.